United States Patent
Mowery et al.

(10) Patent No.: US 11,719,460 B2
(45) Date of Patent: Aug. 8, 2023

(54) SYSTEM FOR PERSONALIZED INDOOR MICROCLIMATES

(71) Applicant: Lennox Industries Inc., Richardson, TX (US)

(72) Inventors: Keith R. Mowery, Plano, TX (US); Nguyen T. Ho, Highland Village, TX (US)

(73) Assignee: Lennox Industries Inc., Richardson, TX (US)

( * ) Notice: Subject to any disclaimer, the term of this patent is extended or adjusted under 35 U.S.C. 154(b) by 0 days.

(21) Appl. No.: 17/645,426

(22) Filed: Dec. 21, 2021

(65) Prior Publication Data

US 2022/0113057 A1   Apr. 14, 2022

Related U.S. Application Data

(62) Division of application No. 16/661,577, filed on Oct. 23, 2019, now Pat. No. 11,255,567.

(Continued)

(51) Int. Cl.
*F24F 11/80* (2018.01)
*F24F 11/59* (2018.01)
(Continued)

(52) U.S. Cl.
CPC .............. *F24F 11/80* (2018.01); *F24F 11/46* (2018.01); *F24F 11/49* (2018.01); *F24F 11/523* (2018.01); *F24F 11/54* (2018.01); *F24F 11/59* (2018.01); *F24F 11/64* (2018.01); *F24F 11/67* (2018.01); *F24F 11/74* (2018.01); *G05B 13/024* (2013.01); *G05B 19/02* (2013.01); *F24F 2003/003* (2013.01); *F24F 2110/10* (2018.01); *F24F 2110/20* (2018.01); *F24F 2120/12* (2018.01); *F24F 2140/40* (2018.01)

(58) Field of Classification Search
CPC .. F24F 11/80; F24F 11/74; F24F 11/54; F24F 11/59; F24F 11/523; F24F 11/49; F24F 11/64; F24F 11/67; F24F 11/56; F24F 2120/10; F24F 2120/12; F24F 2120/14
See application file for complete search history.

(56) References Cited

U.S. PATENT DOCUMENTS 11,047,589 B2   6/2021   Komae et al.
2006/0240764 A1*  10/2006  Pierce ................... F24F 1/0071
                                                                454/329

(Continued)

*Primary Examiner* — Nelson J Nieves
(74) *Attorney, Agent, or Firm* — Baker Botts L.L.P.

(57) ABSTRACT

A network of wireless remote climate sensors in a heating, ventilation, and air conditioning (HVAC) system permits the creation of personalized microclimates within an enclosed space. In addition to collecting temperature and humidity data, the wireless remote climate sensors can detect whether the enclosed space is occupied by a human. Human detection is made possible by optional cameras, microphones, and gas sensors on the wireless remote climate sensors. As the human moves throughout the enclosed space, the HVAC system is able to track the human's movement using the wireless remote climate sensors. The HVAC system may adjust airflow to different portions of the enclosed space based on the human's location. The result is an efficient use of system resources to keep users at their ideal temperature.

9 Claims, 8 Drawing Sheets

Related U.S. Application Data

(60) Provisional application No. 62/749,963, filed on Oct. 24, 2018.

(51) Int. Cl.

| | | |
|---|---|---|
| *F24F 11/523* | (2018.01) | |
| *F24F 11/49* | (2018.01) | |
| *F24F 11/64* | (2018.01) | |
| *F24F 11/67* | (2018.01) | |
| *F24F 11/74* | (2018.01) | |
| *F24F 11/46* | (2018.01) | |
| *F24F 11/54* | (2018.01) | |
| *G05B 13/02* | (2006.01) | |
| *G05B 19/02* | (2006.01) | |
| *F24F 110/20* | (2018.01) | |
| *F24F 140/40* | (2018.01) | |
| *F24F 110/10* | (2018.01) | |
| *F24F 120/12* | (2018.01) | |
| *F24F 3/00* | (2006.01) | |

(56) References Cited

U.S. PATENT DOCUMENTS

| | | | |
|---|---|---|---|
| 2010/0262298 A1* | 10/2010 | Johnson | F24F 11/30 |
| | | | 700/277 |
| 2012/0086562 A1* | 4/2012 | Steinberg | F24F 11/47 |
| | | | 340/12.32 |
| 2016/0258641 A1* | 9/2016 | Cheatham, III | F24F 11/67 |
| 2016/0258643 A1* | 9/2016 | Cheatham, III | F24F 11/67 |
| 2017/0234562 A1* | 8/2017 | Ribbich | F24F 11/86 |
| | | | 700/277 |
| 2018/0259214 A1* | 9/2018 | Wilson | F24F 11/63 |
| 2018/0299153 A1* | 10/2018 | Ajax | F24F 11/0001 |
| 2018/0299158 A1* | 10/2018 | Ajax | F24F 11/56 |
| 2019/0024919 A1* | 1/2019 | Trivedi | G06F 3/0488 |
| 2019/0242605 A1* | 8/2019 | Shekhar Nalajala | F24F 11/52 |
| 2019/0309975 A1 | 10/2019 | Salem et al. | |
| 2020/0000489 A1 | 1/2020 | Fleury et al. | |
| 2020/0119942 A1* | 4/2020 | Read | H04L 12/2809 |
| 2020/0132330 A1 | 4/2020 | Mowery et al. | |
| 2020/0132332 A1 | 4/2020 | Mowery et al. | |
| 2020/0357396 A1 | 11/2020 | Fujii et al. | |
| 2020/0363092 A1 | 11/2020 | Kimata et al. | |
| 2020/0379417 A1 | 12/2020 | Zhang et al. | |
| 2021/0041125 A1 | 2/2021 | Liu et al. | |

\* cited by examiner

SYSTEM FOR PERSONALIZED INDOOR MICROCLIMATES

RELATED APPLICATIONS

This application is a divisional of U.S. patent application Ser. No. 16/661,577 filed Oct. 23, 2019, by Keith R. Mowery et al., and entitled "SYSTEM FOR PERSONALIZED INDOOR MICROCLIMATES," which claims priority Provisional Application No. 62/749,963 filed Oct. 24, 2018, by Keith R. Mowery entitled, "WIRELESS REMOTE INDOOR SENSOR FOR HOME AUTOMATION," which are incorporated herein by reference.

TECHNICAL FIELD

This disclosure relates generally to generally to heating, ventilation, and air conditioning (HVAC) systems and methods of their use. More specifically, this disclosure relates to a wireless remote indoor sensor for HVAC automation.

BACKGROUND

Heating, ventilation, and air conditioning (HVAC) systems are used to regulate environmental conditions within an enclosed space. A thermostat may connect to one or more HVAC units to move, cool, or heat air. Decisions on whether to increase or decrease airflow were traditionally made based on a temperature reading at the thermostat. Because airflow was increased or decreased throughout the system based on a temperature reading in only one isolated area of the enclosed space, hot or cool spots developed in other areas of the enclosed space. Dampers were introduced to restrict air flow to individual rooms to help remedy this shortcoming. However, damper users had to manually adjust the dampers in each room.

Automated dampers were eventually introduced. These automated dampers could include a temperature sensor to help provide a more accurate picture of local temperatures throughout a HVAC system. While an improvement over HVAC systems that make air flow decisions based on a single temperature reading at the thermostat, there are several shortcomings in HVAC systems making heating and cooling decisions based on a network of damper-associated sensors. This approach still gives a vague picture of the temperature map within the enclosed space. For example, a room in a house may only have a single damper. The single sensor cannot illustrate temperature imbalances across the room. Additionally, the location of the sensor at the damper is more accurately describing the temperature of the air exiting the damper rather than the ambient temperature that will be felt by occupants of the room. These factors result in air flow decisions that can exacerbate hot and cool spots in the enclosed space.

SUMMARY OF THE DISCLOSURE

In an embodiment, a heating, ventilation, and air conditioning (HVAC) system includes a network of wireless remote climate sensors to develop a complete heat map of an enclosed space. The remote climate sensor is configured to collect temperature and humidity data on a zone of the enclosed space. The HVAC system uses a network of these sensors to obtain data points across the enclosed space. The resulting heat map is used by the HVAC system to determine where to direct air in the enclosed space. By comparing the temperature and humidity at a specific remote climate sensor with the user's desired temperature and humidity, the HVAC system can decide whether to increase or decrease the air flow through a variable damper that is located near the remote climate sensor. By conducting this analysis throughout the enclosed space and making incremental adjustments to the air flow in hot and cold spots in the enclosed space, the disclosed HVAC system provides even comfort to the user along with reduced energy consumption.

The integration of the wireless remote climate sensors with an HVAC system also permits the creation of personalized microclimates within the enclosed space. In addition to collecting temperature and humidity data, the wireless remote climate sensors can detect whether the enclosed space is occupied by a human. Human detection is made possible by optional cameras, microphones, and gas sensors on the wireless remote climate sensors. As the human moves throughout the enclosed space, the HVAC system is able to track the human's movement using the wireless remote climate sensors. The HVAC system may adjust airflow to different portions of the enclosed space based on the human's location. The result is an efficient use of system resources to keep users at their ideal temperature.

Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Embodiments of the present disclosure and its advantages are best understood by referring to FIGS. 1 through 8 of the drawings, like numerals being used for like and corresponding parts of the various drawings.

As described above, previous HVAC systems lacked the ability to accurately map temperatures across an enclosed space. The present disclosure details a climate sensor designed for installation with existing HVAC systems using a smart thermostat. These sensors form a wireless network that can provide an accurate climate map throughout the enclosed space. The disclosed HVAC system can leverage this network of sensors to make improved allocations of HVAC resources and eliminate hot and cool spots in the enclosed space. A further advantage of the sensor network is that the disclosed HVAC system can track users through different zones of the enclosed space and create a microclimate in the occupied zone while conserving system resources in the unoccupied zones of the enclosed space.

HVAC Sensor Network

Figure 1:
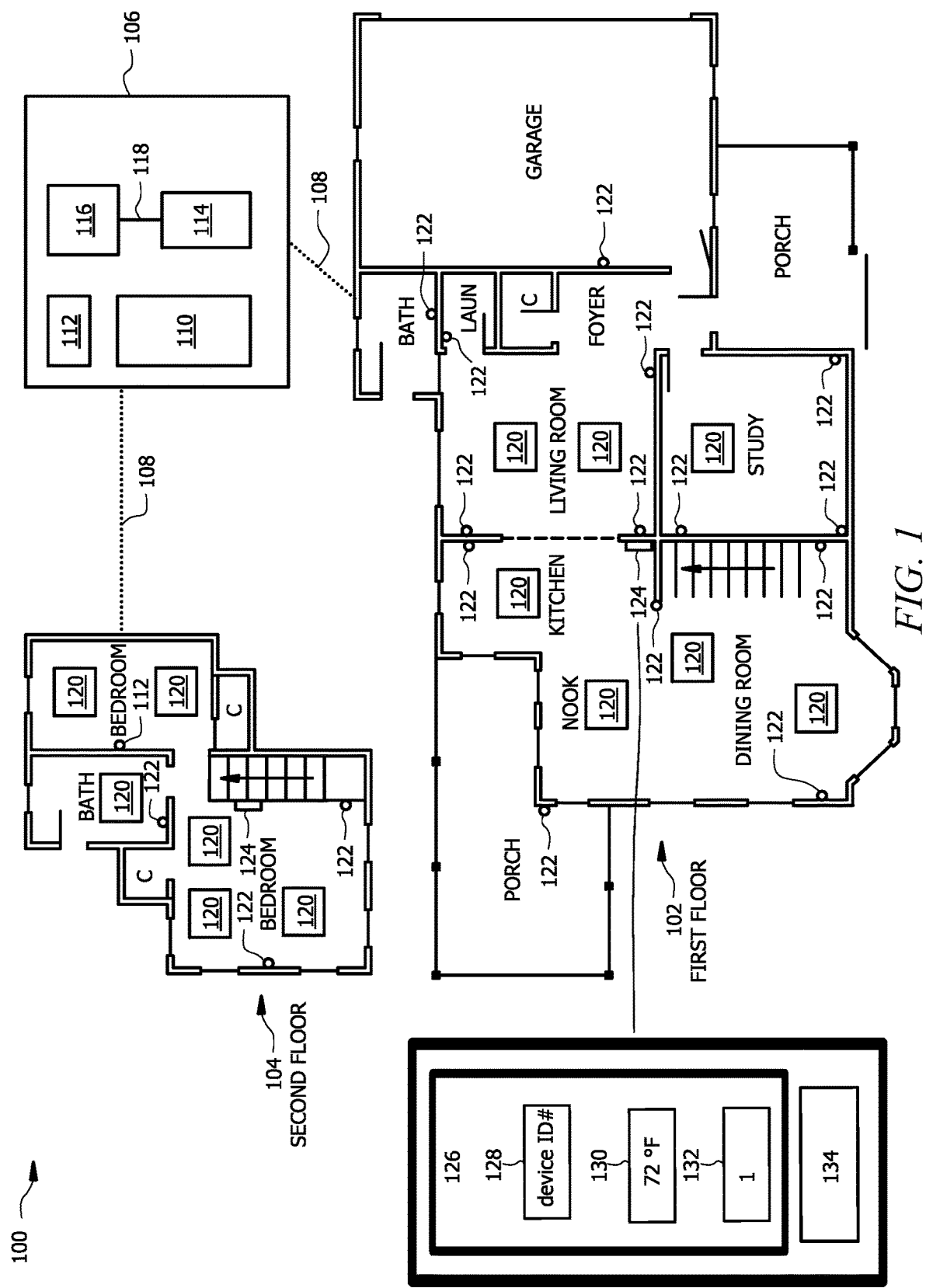
FIG. 1 is a diagram of a residential HVAC system incorporating a network of wireless sensors.

FIG. 1 shows an example of a home employing remote sensor network 100 to control the temperature and humidity inside a building. Sensor network 100 is comprised of HVAC system 102, located on the first floor of the pictured building, and HVAC system 104, located on the second floor of the pictured building. Systems 102 and 104 are linked to HVAC hardware 106 by air ducts 108. HVAC hardware 106 conditions air for delivery to a conditioned space. The conditioned space may be, for example, a room, a house, an office building, a warehouse, or the like. In some embodiments, the HVAC hardware 106 is a rooftop unit (RTU) that is positioned on the roof of a building and the conditioned air is delivered to the interior of the building. In other embodiments, portion(s) of the system may be located within the building and portion(s) outside the building.

Generally, HVAC hardware 106 includes furnace 110, heat exchanger(s) 112, evaporator(s) 114, condensing unit(s) 116, and working-fluid conduit(s) 118. Furnace 110 heats up heat exchanger(s) 112. In turn, heat exchanger(s) 112 warm air before it enters air ducts 108 and is delivered to HVAC systems 102 and 104. Furnace 110 may use any of a number of heat sources. For example, furnace 110 might burn natural gas, propane, oil, or any other combustible compound. Alternatively, furnace 110 might use electric resistance or geo-thermal heat.

An evaporator 114 is generally any heat exchanger configured to provide heat transfer between air flowing through (or across) the evaporator 114 (i.e., air contacting an outer surface of one or more coils of the evaporator 114) and working fluid passing through the interior of the evaporator 114. The evaporator 114 may include one or more circuits. Working fluid generally flows from an evaporator 114 to a condensing unit 116 through fluid conduit 118. A portion of the HVAC hardware 106 is configured to move air across an evaporator 114 and into the air ducts 108 as conditioned airflow.

Working-fluid conduit 118 facilitates the movement of a working fluid (e.g., a refrigerant) through a cooling cycle. The working fluid may be any acceptable working fluid including, but not limited to, fluorocarbons (e.g. chlorofluorocarbons), ammonia, non-halogenated hydrocarbons (e.g. propane), hydroflurocarbons (e.g. R-410A), or any other suitable type of refrigerant.

A condensing unit 116 is generally comprised of a compressor, a condenser, and a fan. In some embodiments, a condensing unit 116 is an outdoor unit while other components of HVAC hardware 106 may be located indoors. The condensing unit 116 is configured to facilitate movement of the working fluid through the working-fluid conduit 118. The condenser is generally located downstream of the compressor and is configured to remove heat from the working fluid. The fan is configured to move air across the condenser. For example, the fan may be configured to blow outside air through the condenser to help cool the working fluid flowing therethrough.

The compressed, cooled working fluid flows from the condenser toward an expansion device. The expansion device is coupled to the working-fluid conduit 118 downstream of the condenser and is configured to remove pressure from the working fluid. In this way, the working fluid is delivered to an evaporator 114 and receives heat from airflow to produce a conditioned airflow that is delivered by air ducts 108 to the conditioned space of HVAC systems 102 and 104. The HVAC hardware 106 may include additional components or may omit one or more components shown in FIG. 1.

Air ducts 108 are distributed throughout the building and use variable dampers 120 as outlets into the building. Variable dampers 120 are valves used to control air flow out of air ducts 108. Dampers 120 may comprise a single flap that can rotate about the centerline of the flap. In the closed position, the single flap completely obstructs the flow of air out of a variable damper 120. As the flap is rotated about its centerline, airflow increases through variable damper 120 until the flap reaches the fully open position. The flap can rotate up to 180 degrees from its initial closed position. This allows variable damper 120 to vary the direction in which the airflow is directed as well as the rate of air flow. Alternatively, variable dampers 120 may comprise several rotatable blades instead of a single flap. In the closed position, the blades meet edge-to-edge to completely obstruct the flow of air out of variable damper 120. Rotation of the blades increases airflow out of variable damper 120. Rotation of the blades in one direction or the other can be used to change the direction of airflow.

In the present disclosure, any mention of opening or closing a damper does not necessarily mean placing the damper in the fully closed or fully open positions. Opening or closing the damper refers to the act of increasing the degree to which the flap or blades have moved toward the fully open or fully closed positions.

Movement of the flap or blades in a variable damper 120 is performed by a motor. Each variable damper 120 also includes a temperature and humidity sensor. An integrated radio allows variable dampers 120 to wirelessly communicate with a control unit 124, which is described in detail below. Control unit 124 wirelessly controls the motor in damper 120 to alter the position of the flap or blades. The temperature and humidity data collected at variable damper 120 is wirelessly transmitted to control unit 124.

In addition to variable dampers 120, HVAC systems 102 and 104 include wireless climate sensors 122 and control units 124. Climate sensors 122 collect temperature and humidity data. The climate sensors 122 can be installed throughout an enclosed space to provide accurate climate data across various portions of the enclosed space. The climate sensors 122 are designed so that they may be installed in pre-existing wall boxes. For example, a climate sensor 122 may be installed in an electrical outlet box in place of a standard electrical outlet. Alternatively, a climate sensor 122 may be installed in a light switch box in place of a standard light switch. The climate sensors 122 can wirelessly communicate with the variable dampers 120 and the control unit 124. Variable dampers 120, climate sensors 122, and control unit 124 may communicate with a variety of wireless protocols. For example, the elements in a single HVAC system may communicate using Bluetooth or Wi-Fi. The structure and function of climate sensor 122 is discussed in more detail below with respect to FIG. 2.

HVAC systems 102 and 104 include separate control units 124. The control unit 124 in HVAC system 102 controls the temperature and airflow through HVAC system 102 while the control unit 124 pictured in HVAC system 104 controls the temperature and airflow through HVAC system 104. While the example in FIG. 1 shows each HVAC system restricted to a single floor of a building, alternate embodiments might use a single control unit 124 to control variable dampers 120 and to interface with climate sensors 122 that are distributed across multiple levels of a building or other enclosed space.

One example of a control unit 124 is a smart thermostat. Smart thermostats are thermostats with wireless networking capabilities. For example, control unit 124 may connect to the internet using Wi-Fi and with other devices using Bluetooth. Alternative protocols utilizing radio or optical frequencies can also be employed. Control unit 124 additionally includes a memory for storing climate profiles and other user settings. Control unit 124 may also access a cloud database for storing climate profiles and user settings.

User settings stored at control unit 124 include a desired temperature. The user settings may also include timers for changing the temperature from a first desired temperature to a second desired temperature. To factor in the effect of humidity on how a temperature feels to a human, the user settings may include a "feels like" temperature. This "feels like" temperature is represented as ET in the following equation: $ET=T_0+w*i_m*LR*(P_a-RH_s*P_{ETs})$. The symbols in the "feels like" equation assume the values listed in the tables below.

| Symbol | Description | Units |
|---|---|---|
| $T_{ID}$ | Indoor Ambient (sensor or anticipated value) | ° F. |
| RH | Relative Humidity | Unitless-% |
| $T_{OD}$ | Outdoor Ambient | ° F. |
| X | Insulation Quality Ratio | Unitless |

| Symbol | Description | Value | Units |
|---|---|---|---|
| LR | Lewis Ratio | 205 | ° F./PSI |
| $RH_s$ | Standard RH | 0.45 | ° F. |
| x | Insulation Ratio (User selectable) | Poor: 0.08 Average: 0.04 Good: 0.02 | Unitless |
| $i_m$ | Clothing insulation permeation efficiency Linearly interpolated based on OD temp, clamped to min at low OD ambient (30° F.), and clamped to max value at high OD amb (90°) | Min: 0.37 Max: 0.45 | Unitless |
| $w_s$ | Standard Skin wittedness | 0.1 | Unitless |
| $T_o$ | Operative Temperature | $(T_{ID} + T_r)/2$ | ° F. |
| $P_a$ | Ambient Vapor Pressure | $RH*P_{as}$ | PSI |
| $P_{as}$ | Ambient Saturated Vapor Pressure | 6.11 * 10 ^ [(7.5 * $T_{ID}$)/(237.7 + $T_{ID}$)] * 0.02953 * 0.491154 Note that for this calculation, $T_{ID}$ is in ° C. | PSI |
| $P_{ETs}$ | Saturated Vapor Pressure at ET | 6.11 * 10 ^ [(7.5 * ET)/(237.7 + ET)] * 0.02953 * 0.491154 Note that for this calculation, ET is in ° C. | PSI |
| $T_r$ | Radiant Temperature | $T_{ID} + x * (T_{OD} - T_{ID})$ | ° F. |
| w | Skin Wettedness | | Unitless |

Since $P_{ETs}$ (saturated vapor pressure at the ET) is not known until the ET is calculated, it is appropriate to use a first guess of 0.5, then calculate the ET, and re-calculate the $P_{ETs}$. This is done repeatedly until the successive calculations of ET converge to the third decimal place.

In addition to user settings, control unit 124 may store climate profiles 126. Climate profiles 126 allow each potential user to save climate settings that can be applied when that user is present. Each climate profile 126 includes at least one user identifier 128. For example, the user identifier 128 might be biometric data, such the user's face, voice, retina, or fingerprint. The user identifier 128 may include a list of wireless devices associated with the user. Each climate profile includes that user's preferred temperature setting 130. Climate profiles 126 also contain a preemption value 132 to be used when control unit 124 applies an arbitration logic 134 in the scenario where more than one user with a climate profile 126 is detected in a zone. The preemption value 132 may be any value equal to or greater than one. It is possible that multiple climate profiles 126 have the same preemption value 132.

The arbitration logic 134 is a setting stored in control unit 124 that may be changed by a user with administrative privileges. The arbitration logic 134 is a set of rules for control unit 124 to apply when it detects multiple users with climate profiles 126. For example, the arbitration logic 134 might be a rule that the climate profile 126 retrieved by control unit 124 with the lowest preemption value 132 will always have its settings applied regardless of any other occupants who may have a climate profile 126. Numerous different arbitration rules may be programmed to suit the needs of the users. Additional explanation of how an arbitration logic 134 operates is provided below with respect to FIGS. 5 and 6.

Control unit 124 is configured to receive user input in several ways. A user can alter settings in control unit 124 by interacting with a touch screen or with physical control buttons on the control unit 124. A user can also remotely change settings in control unit 124 though a mobile web application. Additional detail about the function of control unit 124 is provided below in the discussion related to FIGS. 3-6.

Wireless Remote Indoor Sensor

Figure 2:
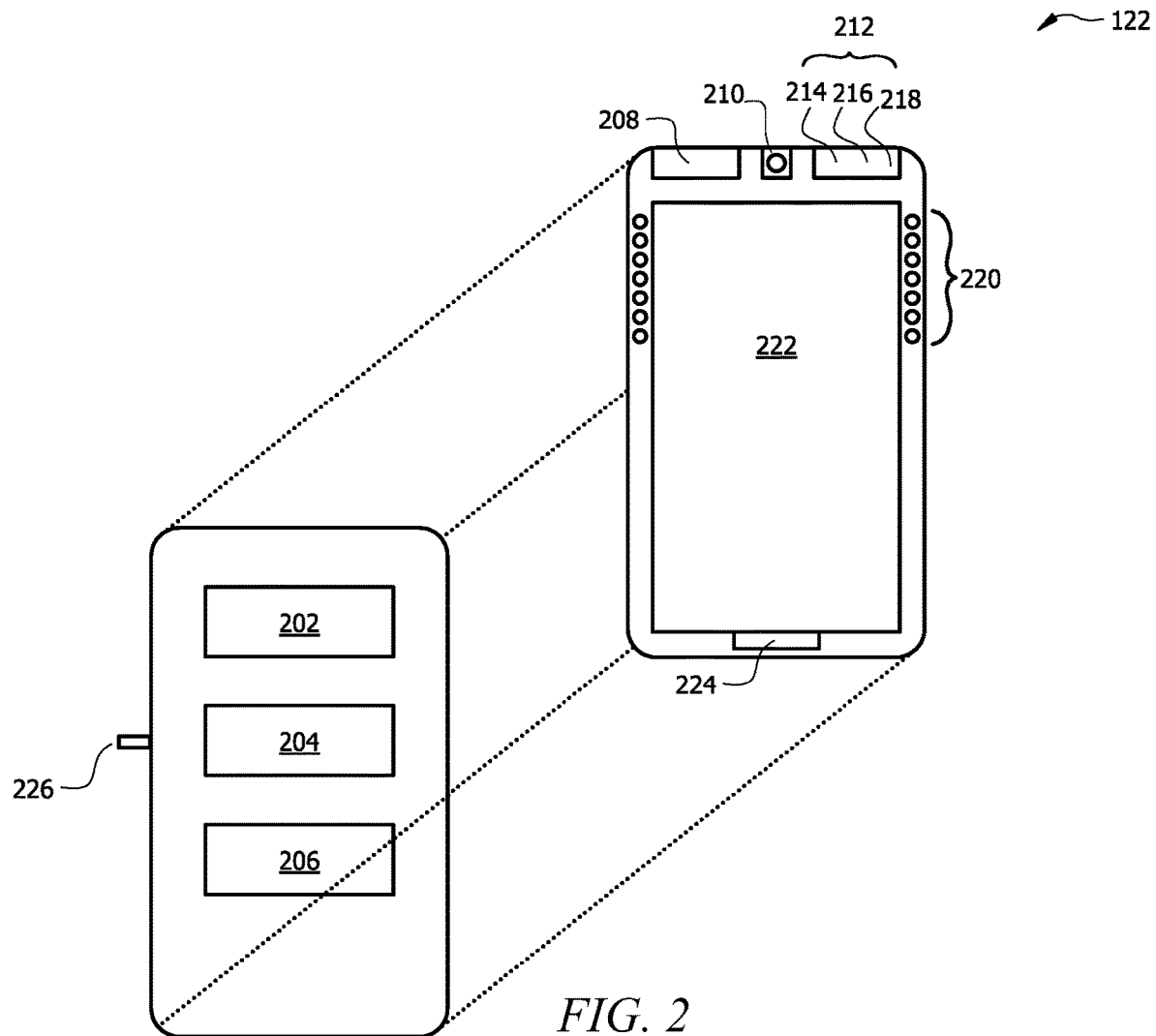
FIG. 2 is a diagram of a wireless HVAC sensor.

FIG. 2 shows an example of the wireless climate sensors 122 depicted in FIG. 1. Climate sensor 122 includes one or more processors 202, a memory 204, and a wireless interface 206. Processor 202 is configured to operate microphone 208, camera 210, environmental data collector 212, speakers 220, face plate 222, and button panel 224. Wireless climate sensors 122 are designed for installation into existing wall boxes, such as a power outlet box or a light switch box. This allows the wireless climate sensor 122 to tie into existing power electrical lines through power junction 226.

The one or more processors 202 are configured to process data and may be implemented in hardware or software. For example, the processors 202 may be 8-bit, 16-bit, 32-bit, 64-bit or of any other suitable architecture. The processors 202 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

Memory 204 represents any suitable combination of hardware and software configured to store data. The components of memory 204 may comprise volatile memory and/or non-volatile memory. A volatile memory medium may include volatile storage. For example, the volatile storage may include random access memory (RAM), dynamic RAM (DRAM), static RAM (SRAM), and/or extended data out RAM (EDO RAM), among others. In one or more embodiments, a non-volatile memory may include non-volatile storage. For example, the non-volatile storage may include read only memory (ROM), programmable ROM (PROM), erasable PROM (EPROM), electrically erasable PROM (EEPROM), a magnetic storage medium (e.g., a hard drive, a floppy disk, a magnetic tape, etc.), ferroelectric RAM (FRAM), flash memory, a solid state drive (SSD), non-volatile RAM (NVRAM), a one-time programmable (OTP) memory, and/or optical storage (e.g., a compact disc (CD), a digital versatile disc (DVD), a BLU-RAY disc (BD), etc.), among others. The term "memory medium" may mean a "memory device," a "memory," a "storage device," a "tangible computer readable storage medium," and/or a "computer-readable medium."

Memory 204 is generally configured to temporarily store data received from microphone 208, camera 210, environmental data collector 212, and speakers 220. Memory 204 also stores instructions, executable on processor 202, for operating microphone 208, camera 210, environmental data collector 212, speakers 220, face plate 222, and button panel 224. This includes a voice digitizer and video processing firmware. Memory 204 may also store various programs such as facial recognition software.

Wireless interface 206 allows climate sensor 122 to wirelessly send and receive data with other devices, including variable dampers 120 and control units 124. Wireless interface 206 further allows the climate sensor 122 to join a wireless internet network. Wireless interface 206 may use any suitable wireless or optical communication protocol, including Bluetooth, ZigBee, an 802.11 standard, or any other appropriate protocol.

Environmental data collector 212 is a sensor array that includes a temperature sensor 214 and a humidity sensor 216. The humidity sensor 216 may be any type of hygrometer including any capacitive, resistive, thermal, gravimetric or any other suitable hygrometer. The temperature sensor 214 may be any sensor operable to measure the temperature of an environment, including, for example an electronic thermometer. Alternate embodiments of environmental data collector 212 also includes a gas detector 218. The gas detector 218 may be any sensor suitable for detecting the presence and concentration of a gas. For example, the sensor may be a combustible gas sensor, a photoionization detector, an infrared point sensor, an ultrasonic sensor, an electrochemical gas sensor, or a semiconductor sensor. The gas detector 218 can measure the presence of gases such as carbon dioxide, carbon monoxide, and methane.

In one embodiment face plate 222 is a device operable to display information and receive user input. For example, face plate 222 may be a touch screen with a liquid crystal or OLED display. The touch screen may be any variety of touch screen, including, for example resistive touch, surface capacitive, projected capacitive, surface acoustic wave touch, or infrared touch. In certain embodiments, touch screen installed as face plate 222 is used to operate a light. When wireless climate sensor 122 is installed in a pre-existing light switch box, wireless climate sensor 122 may serve as an electronic switch. The light wiring is removed from the previous light switch and installed at power junction 226. A physical switch can be depicted on the screen and wireless climate sensor 122 will alter the lighting based on manipulation of the switch depicted on the screen. Alternatively, the touch screen may respond to hand gestures for adjusting power to the light regardless of what is depicted on touch screen.

Because wireless climate sensor 122 is also designed to fit in wall boxes other than light switch boxes, face plate 222 may be replaced with one of several functional or decorative faceplates. For example, a solid faceplate may be used to minimize the appearance of wireless climate sensor 122. In an alternate embodiment, face plate 222 may include electrical outlet sockets.

Additional details about the function of microphone 208, camera 210, speakers 220, and button 224 are included below in the discussions of FIGS. 3-8.

Management of an HVAC System with a Wireless Remote Indoor Sensor Network

Figure 3:
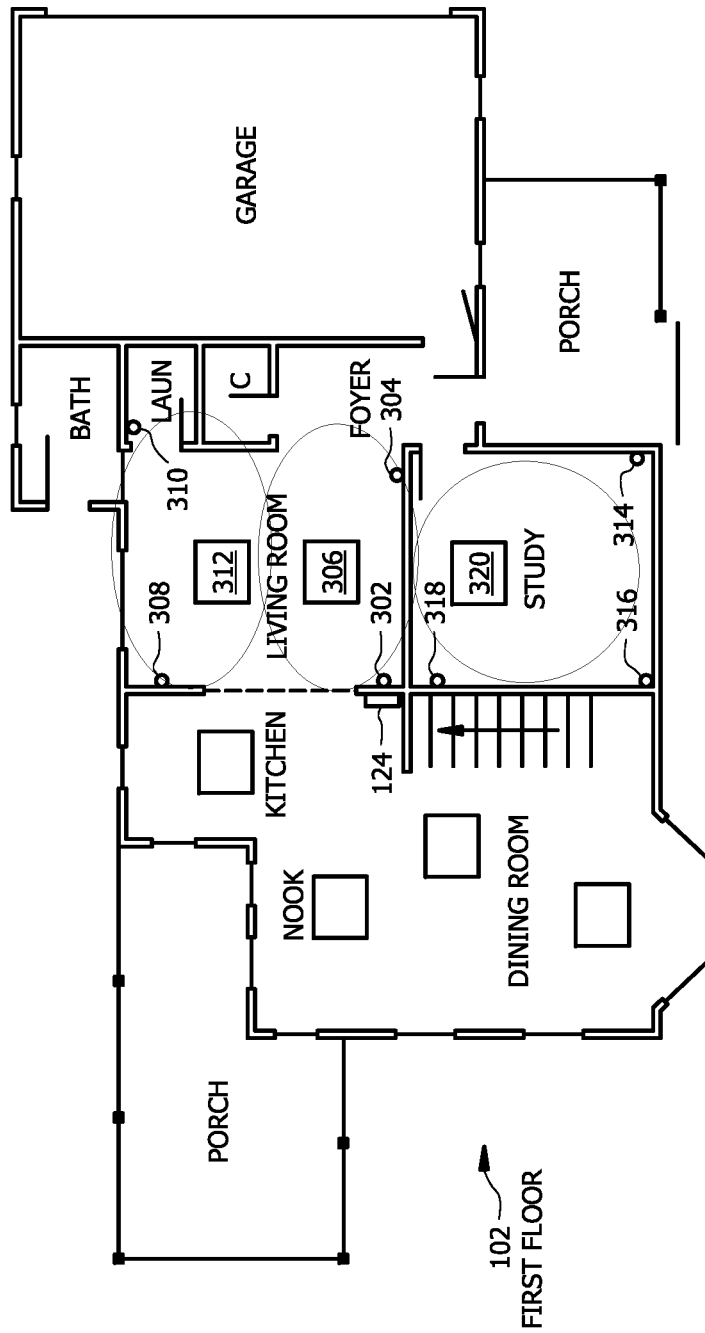
FIG. 3 is a diagram illustrating how the system illustrated in FIG. 1 can be used to maintain an indoor climate.

FIG. 3 is an embodiment of the HVAC system 102 depicted in FIG. 1. Some variable dampers 120 and climate sensors 122 are individually numbered to better illustrate how HVAC system 102 operates. Other aspects of HVAC system 102 were omitted for simplicity. Each HVAC system may be divided into a plurality of zones. Each zone is associated with a variable damper 120. In FIG. 3, climate sensors 302 and 304 wireless communicate with variable damper 306 to form a first climate zone. Climate sensors 308 and 310 wirelessly communicate with variable damper 312 to form a second climate zone. Climate sensors 314, 316, and 318 wirelessly communicate with variable damper 320 to form a third climate zone. Variable dampers 306, 312, and 320 are in wireless communication with control unit 124. Alternately, the climate sensors 302, 304, 308, 310, 314, 316, and 318 may communicate directly with control unit 124 and be linked to a zone at the control unit. For example, a user might pair climate sensors 314, 316, and 318 with control unit 124 and edit the zone settings at the control unit 124 to associate climate sensors 314, 316, and 318 with the third climate zone (variable damper 320).

Figure 4:
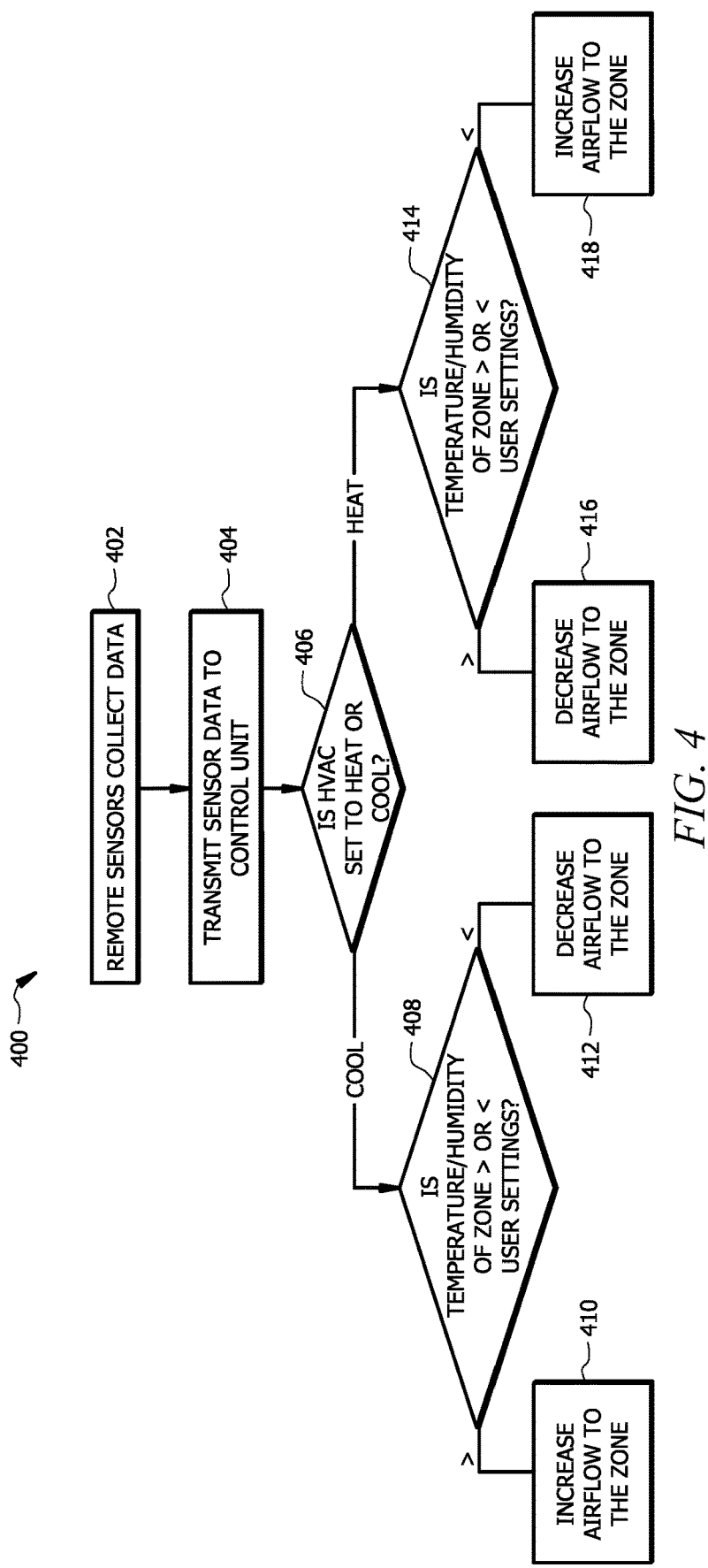
FIG. 4 is a flowchart of example methods for maintaining an indoor climate using the system illustrated in FIG. 3.

FIG. 4 provides a flowchart for a method 400 of operating an HVAC system based on input from a network of wireless climate sensors as depicted in FIG. 3. At step 402 the climate sensors in HVAC system 102 collect data on the climate of their location, including a temperature and a humidity measurement. Thus, the pictured climate sensors 302, 304, 308, 310, 314, 316, and 318 each take a temperature and humidity measurement. Variable dampers, such as the depicted variable dampers 306, 312, and 320, likewise collect temperature and humidity measurements. At step 404, the collected climate data is sent to control unit 124. This may occur in at least two ways. First, the climate sensors may wirelessly transmit their collected climate data to their associated variable damper. For example, referring to the third zone (variable damper 320), climate sensors 314, 316, and 318 send their climate data to variable damper 320. Variable damper then wirelessly transmits the data received from climate sensors 314, 316, and 318 along with the temperature and humidity measurements collected by variable damper 320 to control unit 124. Alternatively, climate sensors 314, 316, and 318 may wirelessly transmit their climate data directly to control unit 124 while variable damper 320 wirelessly transmits the temperature and humidity measurements that it collects.

At step 406 the control unit 124 determines whether the HVAC system 102 is set to heat or cool. To illustrate, consider a scenario where the HVAC system 102 is set to cool. Now the control unit 124 proceeds to step 408 where it retrieves the user settings and compares it to the climate data received from the climate sensors and variable dampers. In this example the user setting in control unit 124 is an ambient temperature of 70° F. The temperature measurements received from climate sensors from the first climate zone (climate sensor 302, climate sensor 304, and variable damper 306) are 71° F., from the second climate zone (climate sensor 308, climate sensor 310, and variable damper 312) are 68° F., and from the third climate zone (climate sensor 314, climate sensor 316, climate sensor 318, and variable damper 320) are 73° F. Control unit 124 determines that climate zones one and three exceed the user settings and that climate zone two is below the user settings. Because the temperature measurements from climate zones one and three exceed the user settings, control unit 124 advances to step 410 and increases the airflow to zones one and three. Control unit 124 accomplishes this by wirelessly transmitting instructions to variable dampers 306 and 320 to increase the degree to which the damper is open. Because the temperature in zone three is greater than the temperature in zone one, variable damper 320 is ordered to open to a greater degree than variable damper 306. Because the temperature measurements from climate zone two fall below the user settings, control unit 124 advances to step 412 and decreases the airflow to zone two. Control unit 124 accomplishes this by wirelessly transmitting instructions to variable damper 312.

While the previous example addressed how method 400 operates when a temperature imbalance arises between the user settings and the different climate zones, alternate scenarios may arise where the various climate sensors in a climate zone do not return the same temperature measurement. This indicates an uneven heat map across the localized climate zone. To illustrate, assume that the user setting for temperature is 68° F. and the HVAC system 102 is set to heat. This example will focus on climate zone three (climate sensor 314, climate sensor 316, climate sensor 318, and variable damper 320) for the sake of simplicity. At step 402 climate sensors 314 and 316 measure the temperature as 70° F. Climate sensor 318 measures the temperature as 67° F. Variable damper 320 measures the temperature as 68° F. At step 404, the collected climate data is sent to control unit 124 as described in the previous example. Control unit 124 determines that HVAC system 102 is set to heat. Proceeding to step 414, control unit 124 and compares the sensor measurements to the user setting of 68° F. Because climate sensors 314 and 316 measured the temperature as greater than the user setting, control unit 124 proceeds to step 416 to decrease the air flow to the locations of climate sensors 314 and 316. Because climate sensor 318 measured the temperature as less than the user setting, control unit 124 proceeds to step 418 to increase airflow to the location of climate sensor 318. This example deviates from the previous example in that control unit 124 must instruct variable damper 320 to do more than just increase the opening of the damper. Control unit 124 must also instruct variable damper 320 on which direction to rotate the damper opening so that the flow of air is increased in the direction of climate sensor 318 while the flow of air is decreased to climate sensors 314 and 316.

Personalized Microclimates

Figure 5:
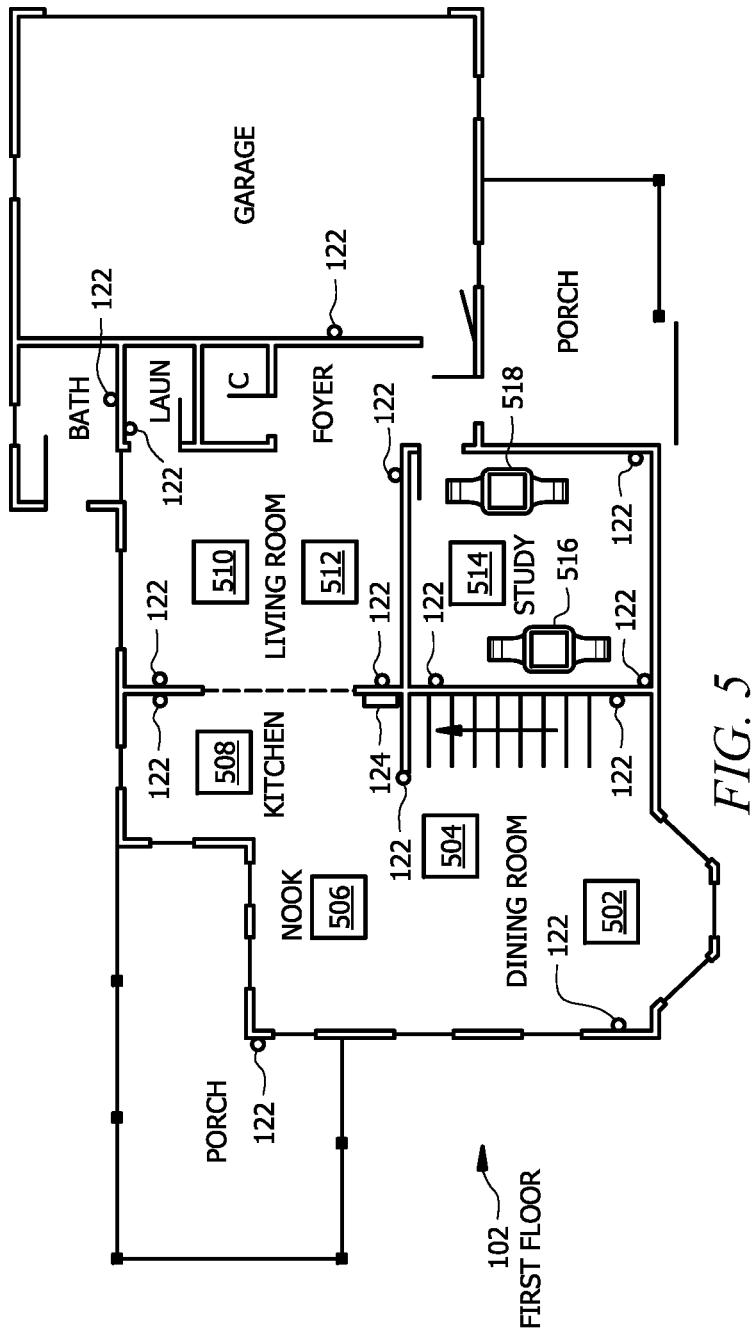
FIG. 5 is an example of the system illustrated in FIG. 1 that can create personalized microclimates.

FIG. 5 is an embodiment of the HVAC system 102 depicted in FIG. 1 that illustrates how wireless devices associated with particular users may be used to create personalized microclimates. A microclimate is a temperature and humidity setting that may be applied as users move between zones. For clarity, each variable damper 120 is renumbered to show the individual zones in HVAC system 102. Each of variable dampers 502, 504, 506, 508, 510, 512, and 514 has at least one wireless climate sensor 122 paired to that damper to form a zone. Reference to a variable damper should be understood to encompass that zone.

Figure 6:
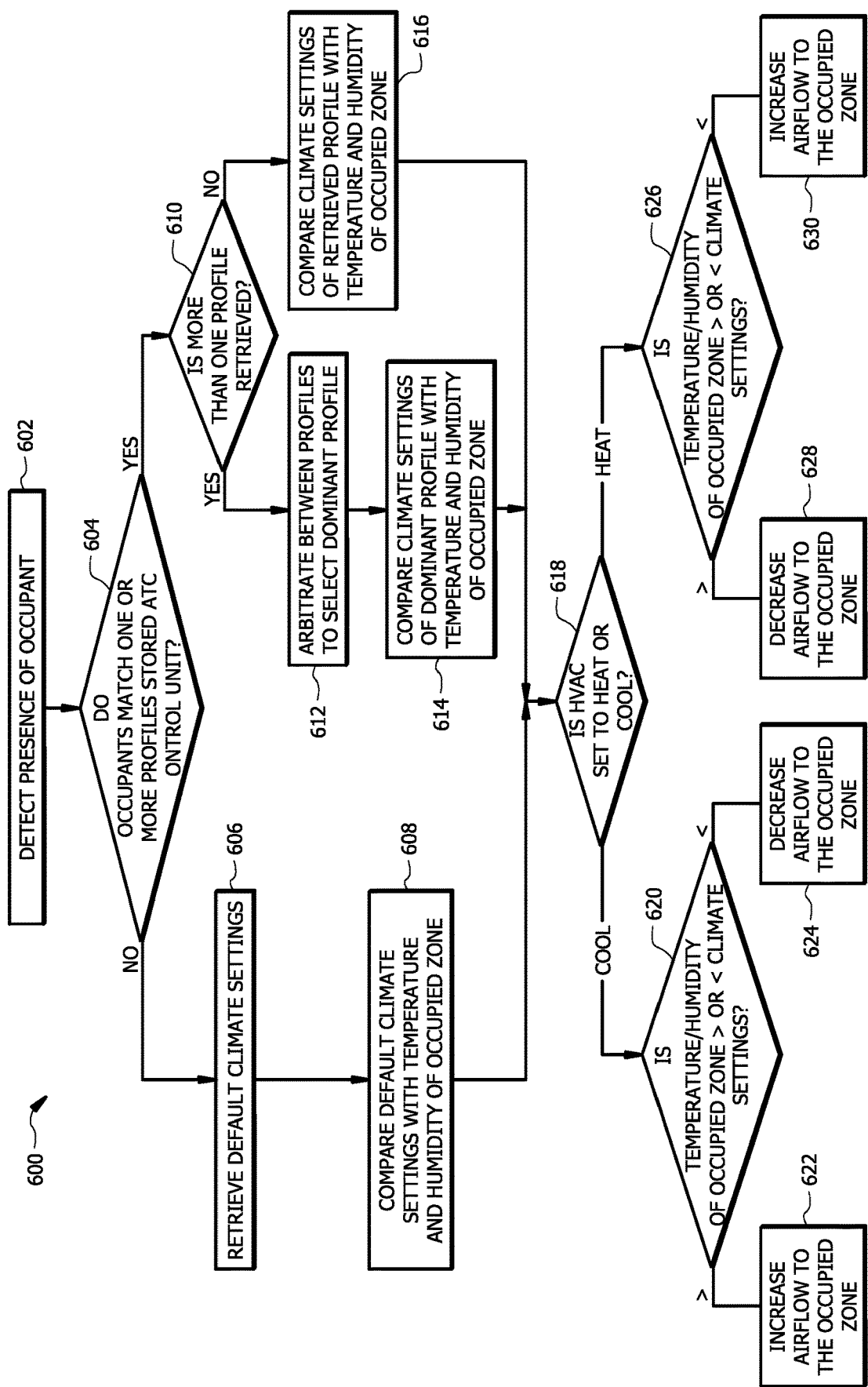
FIG. 6 is a flowchart of example methods for creating personalized microclimates using the system illustrated in FIG. 5.

FIG. 6 is a flowchart of a method 600 for creating personalized microclimates in HVAC systems like HVAC system 102 depicted in FIG. 5. Starting at step 602, the HVAC system 102 detects the presence of an occupant or occupants in a zone. Detection may occur in several ways. In FIG. 5, identification is based on a wireless device, the pictured smart watches 516 and 518. The climate sensors 122 associated with zone 514 periodically search for Bluetooth capable devices. They detect smart watches 516 and 518. Proceeding to step 604 the wireless climate sensors and variable damper of zone 514 send a device ID for the smart watches 516 and 518 to control unit 124. Control unit 124 then determines whether the device ID of either smart watch 516 or 518 matches a device listed as a user identifier in a climate profile stored in control unit 124.

While the user device in FIG. 5 is a smart watch, this method also works with other wireless devices such as mobile phones, tablets, and computers. The design of wireless climate sensor 122 also permits several other methods of detecting occupants that have a climate profile. For example, camera 210 captures images of humans in the vicinity and facial recognition software loaded to memory 204 and executed on processor 202 may identify the humans. Camera 210 may also function as a retinal scanner. In another embodiment microphone 208 monitors the audio conditions in the vicinity and uses voice recognition software loaded to memory 204 and executed on processor 202 to collect a voice signature that may be compared to a voice signature stored as a user identifier in a climate profile. In yet another embodiment the faceplate 222 is a touchscreen that is configured to scan portions of a hand or finger. Environmental data collector 212 may be used to detect the presence of occupants by measuring the carbon dioxide levels in a zone. When the carbon dioxide level exceeds a baseline value, wireless climate sensor 122 determines that humans or other animals are in the vicinity.

Returning to the example in FIG. 5, control unit 124 determines that that there is a match between the device IDs of smart watches 516 and 518 and at least one climate profile. Control unit 124 proceeds to step 610 where it further determines that smart watches 516 and 518 are listed in a first and a second climate profile, respectively. Control unit 124 then advances to step 612 where it must arbitrate between the first climate profile and the second climate profile to decide which settings to apply to zone 514. Control unit 124 first checks the arbitration logic settings. In this example the system administrator has established a rule that control unit 124 must find the average of the between the climate settings of the detected climate profiles. This set of averaged values is treated as if it was the dominant profile. In this example, assume that the first climate profile includes a preferred temperature of 71° F. and that the second climate profile includes a preferred temperature of 73° F. Applying the prescribed arbitration logic, control unit 124 determines that the appropriate temperature to apply in zone 514 is 72° F., the average of the preferred temperatures of the first and second climate profiles.

This process is straightforward when only a single profile is detected in a zone. The climate settings in that profile will apply. There may be scenarios where humans are detected in a zone but control unit 124 does not find an associated climate profile. For example, a climate sensor 122 might detect a new Bluetooth capable device, indicating that someone entered the zone, but when the control unit 124 receives the device ID for this new Bluetooth capable device the control unit 124 does not find a match with any of the device IDs listed in the climate profiles. Control unit 124 will retrieve a set of default climate settings to apply in cases like this where an occupant enters a zone but cannot be identified.

Returning to the example of FIG. 5, control unit 124 proceeds to step 618 and determines whether HVAC system 102 is set to heat or cool. In this example, it determines that HVAC system 102 is set to cool. Proceeding to step 620, the control unit 124 then determines whether the temperature of zone 514 is greater than the applicable climate setting of 72° F. In this example, variable damper 514 and its associated wireless climate sensors 122 detected a temperature of 74° F. Because the temperature of zone 514 is greater than the applicable climate setting of 72° F., control unit 124 proceeds to step 622 and increases the airflow to zone 514. Control unit 124 causes an increase in airflow to the zone in question in the same manner as described in FIGS. 3 and 4.

While this example assumed that the climate sensors in zone 514 measured a consistent 74° F. across the zone, there will be cases in which there is a temperature gradient across the zone. The methods discussed in FIG. 4 for correcting temperature imbalances when within a zone are equally applicable in the context of creating personalized microclimates.

An alternate embodiment of the HVAC system 102 pictured in FIG. 5 makes HVAC control decisions based on biometric measures rather than climate profiles. For example, HVAC system 102 can take advantage of the ability of a smart watch 516 to measure a user's heart rate. When a user's heart rate, as detected by smart watch 516, exceeds at least fifty percent of the user's maximum heart rate, the smart watch 516 may send a signal to control unit 124 that the user of smart watch 516 is likely engaged in moderate to vigorous physical activity. Control unit 124 then determines that it needs to increase airflow to the location of the user of smart watch 516. In this embodiment, control unit 124 would instruct variable damper 514 to increase airflow. The design of the wireless climate sensors makes it possible to practice this embodiment even if the users do not have wearable devices that can collect biometric measurements and wirelessly transmit them to the control unit 124. For example, environmental data collector 212 may measure the carbon dioxide content of a room. A spike in carbon dioxide concentration may indicate that an occupant is engaged in vigorous physical activity or that new occupants have entered the zone. When the carbon dioxide measurement data sent to control unit 124 indicates such a spike in carbon dioxide in a zone, control unit 124 will determine that it should increase the airflow to that zone.

Voice Applications for the Climate Sensors

Figure 7:
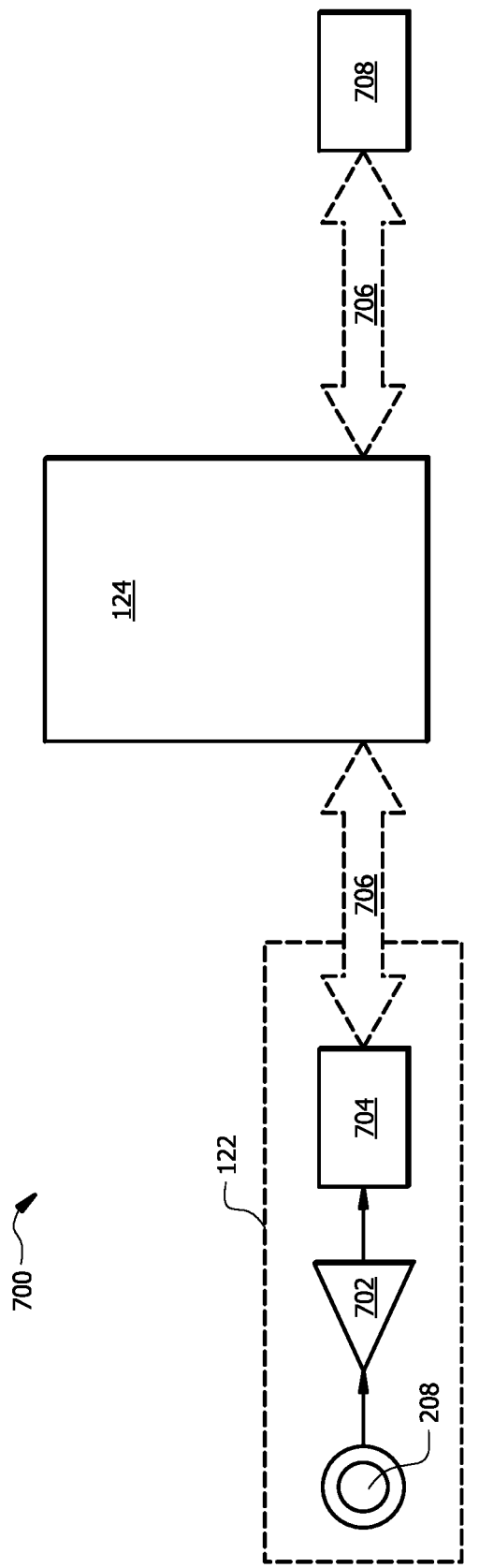
FIG. 7 is a diagram illustrating the integration of digital personal assistants with the system illustrated in FIG. 1.

FIG. 7 illustrates how a HVAC system incorporating a network of wireless climate sensors can expand the use of voice control across numerous smart devices and digital personal assistants. System 700 includes climate sensor 122 control unit 124 which are in signal communication over wireless link 706. Some reference will be made to the details of climate sensor 122 that are detailed in FIG. 2. Wireless link 706 includes any of the wireless data transmission methods discussed with respect to FIG. 2. Control unit 124 is also in signal communication with smart device 708 using a wireless link 706. This wireless link 706 may be of the same protocol as the wireless link between climate sensor 122 and control unit 124 or it may be another wireless protocol. Smart device 708 may include one or more electronic device that is configured to receive voice commands, including virtual assistants, smart televisions, and other appliances that respond to voice control.

When someone speaks, climate sensor 122 picks up the voice signal using microphone 208. Voice digitizer module 702 converts the voice into a digital signal and transfers it to transmission module 704 which packetizes and sends the digital voice signal over wireless link 706, for example using Wi-Fi, to control unit 124. Control unit 124 relays the digital voice signal to smart device 708. Smart device 708 receives the digital voice signal and executes the instructions.

The previous example of system 700 requires depends on smart device 708 being able to receive digital commands in place of audible commands. An alternate embodiment of system 700 avoids potential incompatibility issues by leveraging the climate sensor network as an intercom system. The initial steps of voice detection by a climate sensor 122 and processing of the signal are the same. This alternate embodiment deviates from the previous example following the receipt of the digital voice signal at control unit 124. Instead of sending the signal directly to the smart device 708, control unit 124 analyzes the voice signal to determine which climate sensor is nearest to the destination smart device 708. Control unit 124 then transmits the digital voice signal to that climate sensor 122 using a wireless link 706 such as Wi-Fi. The destination climate sensor 122 receives the digital voice signal, converts the signal to analog using a DAC module, and emits the analog signal through speaker 220. The audio signal emitted from speaker 220 reaches the smart device 708 as if the user was speaking near the smart device 708.

Bridge for Integrating HVAC Services with Home Automation Platforms

Figure 8:
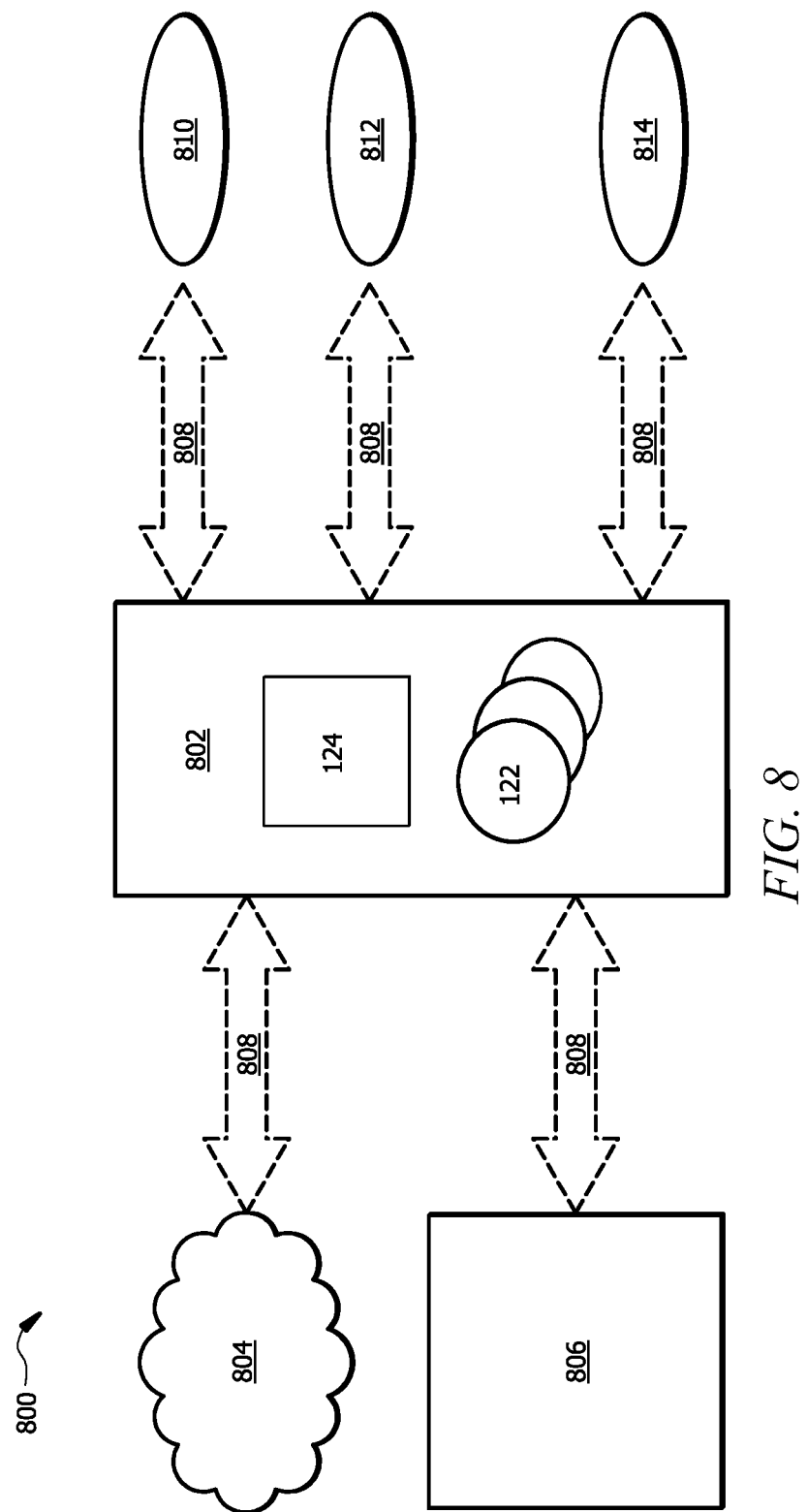
FIG. 8 is a diagram illustrating the service bridge functionality of the system illustrated in FIG. 1.

FIG. 8 illustrates how a HVAC system incorporating a network of wireless climate sensors can serve as bridge for integrating disparate home automation systems. Current systems require that any accessories trying to communicate with a home automation system send the requests in the native language of the home automation system. This makes it difficult to integrate devices designed for different platforms.

System 800 is centered around wireless bridge 802. Wireless bridge 802 is the network formed by a plurality of wireless climate sensors 122 and a control unit 124. Details on the structure and function of climate sensors 122 and control unit 124 may be found in the discussion of FIGS. 1-2. In system 800 the control unit 124 is further configured with a translation module, stored in memory 204 and executable on processor 202, capable of converting between proprietary home automation protocols. Wireless bridge 802 is in signal communication with cloud database 804 and home automation system 806 through wireless link 808. A wireless link 808 also allows control unit 124 to communicate with a first virtual assistant device 810, a second virtual assistant device 811, and second home automation system 814. Wireless link 800 is any suitable wireless protocol, including Wi-Fi or Bluetooth.

Cloud database 804 is a remote operating system for an HVAC system. Home automation systems 806 and 814 comprise at least one control device paired with at least one home appliance. For example, home automation system 806 may comprise a mobile control application on a smartphone that controls the operation of lights and ceiling fans in a house. Home automation system 814 comprises a mobile control application on a smartphone that controls televisions and audio appliances in the house. The controllers for home automation systems 806 and 814 are not interoperable.

Virtual assistant devices 810 and 812 are likewise incapable of operating together. Each virtual assistant device 810 and 812 is a software agent embedded in the operating system of a smart device that can perform tasks based on audible commands or questions. Virtual assistant device 810 can control other smart devices using the same operating system as virtual assistant device 810, and virtual assistant device 812 can control other smart devices using the same operating system as virtual assistant device 812.

Users can harmonize these disparate home automation systems and virtual assistant devices using wireless bridge 802. For example, a user provides a command to a virtual assistant device 810. Virtual assistant device 810 transmits instructions for carrying out the command to control unit 124 of wireless bridge 802. Control unit 802 determines which that the appliance to which the command applies is controlled by home automation system 814. Control unit 124 then translates the command from the protocol used by virtual assistant 810 to that of home automation system 814. Control unit then sends the translated command to home automation system 814. The command may be sent directly to home automation system 814, or in the case where home automation system 814 can only send and receive wireless signals from short range, control unit 814 may identify which of the climate sensors 122 is nearest the home automation system 814 and use that climate sensor 122 to relay the command to home automation system 814.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 122(f) as it exists on the date of filing hereof unless the words "means for" or "step for" are explicitly used in the particular claim.

What is claimed:

1. A wireless remote sensor for managing an indoor climate system, the wireless remote sensor comprising:
   a housing that fits into a wall box;
   an environmental data collector, wherein the environmental data collector comprises a thermometer and a hygrometer;
   a memory configured to store data collected by the environmental data collector and a database of human identification characteristics, wherein each one of the human identification characteristics is associated with a climate profile corresponding to a human; and
   a processor coupled to the memory and the environmental data collector, the processor configured to:
      detect the presence of the human in a zone;
      compare characteristics of the detected human with the database of human identification characteristics stored in the memory to determine the climate profile corresponding to the human;
      transmit, to a HVAC control unit, the determined climate profile;
      determine a temperature measurement and a humidity measurement associated within the zone; and
      transmit the temperature measurement and the humidity measurement to the HVAC control unit, wherein the HVAC control unit adjusts the airflow to the zone based on the temperature measurement and the humidity measurement.

2. The wireless remote sensor of claim 1, wherein the wall box is a light switch box,
   further comprising a touch screen, and
   wherein the processor is further configured to act as a virtual light switch based on user interaction with the touch screen.

3. The wireless remote sensor of claim 1, wherein the wall box is an electrical outlet box, further comprising at least one socket for accepting an electric plug.

4. The wireless remote of claim 1, further comprising a camera, and wherein the processor is further configured to detect the presence of the human using facial recognition software.

5. The wireless remote sensor of claim 1, further comprising a microphone, and wherein the processor is further configured to detect the presence of the human using voice recognition software.

6. The wireless remote sensor of claim 1, wherein the environmental data collector further comprises a gas detector capable of measuring carbon dioxide concentration in the air.

7. A method for managing an indoor climate system, the method comprising:
   storing data collected by an environmental data collector that comprises a thermometer and a hygrometer, and a database of human identification characteristics, wherein each one of the human identification characteristics is associated with a climate profile corresponding to a human;
   detecting the presence of the human in a zone;
   comparing characteristics of the detected human with the database of human identification characteristics stored in the memory to determine the climate profile corresponding to the human; and
   transmitting, to an HVAC control unit, the determined climate profile;
   determining a temperature measurement and a humidity measurement associated within the zone; and
   transmitting the temperature measurement and the humidity measurement to the HVAC control unit, wherein the HVAC control unit adjusts the airflow to the zone based on the temperature measurement and the humidity measurement.

8. The method of claim 7, further comprising detecting the presence of the human using facial recognition software.

9. The wireless remote sensor of claim 7, further comprising detecting the presence of the human using voice recognition software.

\* \* \* \* \*